(12) United States Patent
Rogers

(10) Patent No.: US 6,193,202 B1
(45) Date of Patent: Feb. 27, 2001

(54) MAGNETIC DRINKING VESSEL HOLDING DEVICE

(76) Inventor: Joni M. Rogers, 24092 Golden Pheasant La., Murrieta, CA (US) 92562

( * ) Notice: Subject to any disclaimer, the term of this patent is extended or adjusted under 35 U.S.C. 154(b) by 0 days.

(21) Appl. No.: 09/322,350

(22) Filed: May 28, 1999

(51) Int. Cl.[7] .................................................. A47K 1/08
(52) U.S. Cl. ................... 248/311.2; 248/312.1; 248/309.4; 248/106; 248/213.2; 248/206.5; 248/683
(58) Field of Search ......................... 248/311.2, 312, 248/312.1, 309.4, 106, 213.2, 103, 206.5, 683

(56) References Cited

U.S. PATENT DOCUMENTS

| | | | |
|---|---|---|---|
| 2,580,099 | * 12/1951 | Jaeger | 175/367 |
| 3,982,716 | * 9/1976 | Trees | 248/206 |
| 4,191,350 | * 3/1980 | Ormond | 248/293 |
| 4,976,385 | * 12/1990 | Matsumoto | 224/42.42 |
| 5,409,190 | * 4/1995 | Mattox | 248/315 |
| 5,474,273 | * 12/1995 | Vinal | 248/311.2 |
| 5,873,486 | * 2/1999 | Morgan | 220/739 |

* cited by examiner

Primary Examiner—Leslie A. Braun
Assistant Examiner—A. Joseph Wujciak
(74) Attorney, Agent, or Firm—Goldstein & Canino

(57) ABSTRACT

A magnetic drinking vessel holding device including a bottle holding portion adapted for holding a beverage container therein. A magnetic securement device is coupled with the rectangular base of the bottle holding portion. The magnetic securement device has an arcuate outer surface for adhering to curved metallic surfaces.

1 Claim, 2 Drawing Sheets

MAGNETIC DRINKING VESSEL HOLDING DEVICE

BACKGROUND OF THE INVENTION

The present invention relates to a magnetic drinking vessel holding device and more particularly pertains to adhering to a magnetic surface for holding water or the like for easy access by a user.

People that consume beverages, such as water, during activities are frequently in need of a place to store the container that holds the beverage during non-use periods. Activities such as exercising on a treadmill or stationary bicycle and mowing the lawn often cause the performer of these activities to work up a sweat thereby creating a thirst. The performers are sometimes forced to carry a beverage container with them while they are involved in these tasks. What is needed is a portable holding device that can be simply attached to a piece of equipment that is capable of holding the beverage container at times when the performer is not drinking from it.

The present invention seeks to solve the above mentioned problem by providing a portable drinking vessel container holding device that can be simply attached to a magnetic surface by means of a magnetic surface.

The use of bottle holding devices is known in the prior art. More specifically, bottle holding devices heretofore devised and utilized for the purpose of holding beverages for convenient use are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,191,350 to Ormond discloses a holder for a container such as a bottle with a magnetic base for attracting and storing the support rings while not in use. U.S. Pat. No. 4,063,701 to Wray discloses a use of a net type suspension beverage support device for attachment to a chair. U.S. Pat. No. 4,998,652 to Champagne discloses a clamp for attaching water bottles to various metal devices such as bicycles.

While these devices fulfill their respective, particular objective and requirements, the aforementioned patents do not describe a magnetic drinking vessel holding device for adhering to a magnetic surface for holding water or the like for easy access by a user.

In this respect, the magnetic drinking vessel holding device according to the present invention substantially departs from the conventional concepts and designs of the prior art, and in doing so provides an apparatus primarily developed for the purpose of adhering to a magnetic surface for holding water or the like for easy access by a user.

Therefore, it can be appreciated that there exists a continuing need for a new and improved magnetic drinking vessel holding device which can be used for adhering to a magnetic surface for holding water or the like for easy access by a user. In this regard, the present invention substantially fulfills this need.

SUMMARY OF THE INVENTION

In the view of the foregoing disadvantages inherent in the known types of bottle holding devices now present in the prior art, the present invention provides an improved magnetic drinking vessel holding device. As such, the general purpose of the present invention, which will be described subsequently in greater detail, is to provide a new and improved magnetic drinking vessel holding device and method which has all the advantages of the prior art and none of the disadvantages.

To attain this, the present invention essentially comprises a bottle holding portion adapted for holding a beverage container therein. The bottle holding portion is comprised of a rectangular base having an arcuate inner surface and a generally planar outer surface. The bottle holding portion includes an upper ring secured to an upper end of the arcuate inner surface of the rectangular base. The bottle holding portion includes a lower ring secured to a lower end of the arcuate inner surface of the rectangular base. The lower ring has a containment bracket disposed therein for supporting a beverage container thereon. The bottle holding portion includes a pair of curved side support braces extending between the upper ring and the lower ring thereof. A magnetic securement device is coupled with the rectangular base of the bottle holding portion. The magnetic securement device has a plastic outer layer disposed thereover. The magnetic securement device has an arcuate outer surface for adhering to curved metallic surfaces.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetic drinking vessel holding device which has all the advantages of the prior art bottle holding devices and none of the disadvantages.

It is another object of the present invention to provide a new and improved magnetic drinking vessel holding device which may be easily and efficiently manufactured and marketed.

It is a further object of the present invention to provide a new and improved magnetic drinking vessel holding device which is of durable and reliable construction.

An even further object of the present invention is to provide a new and improved magnetic drinking vessel holding device which is susceptible of a low cost of manufacture with regard to both materials and labor, and which accordingly is then susceptible of low prices of sale to the consuming public, thereby making such a magnetic drinking vessel holding device economically available to the buying public.

Even still another object of the present invention is to provide a new and improved magnetic drinking vessel holding device for adhering to a magnetic surface for holding water or the like for easy access by a user.

Lastly, it is an object of the present invention to provide a new and improved magnetic drinking vessel holding device including a bottle holding portion adapted for holding a beverage container therein. A magnetic securement device is coupled with the rectangular base of the bottle holding portion. The magnetic securement device has an arcuate outer surface for adhering to curved metallic surfaces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
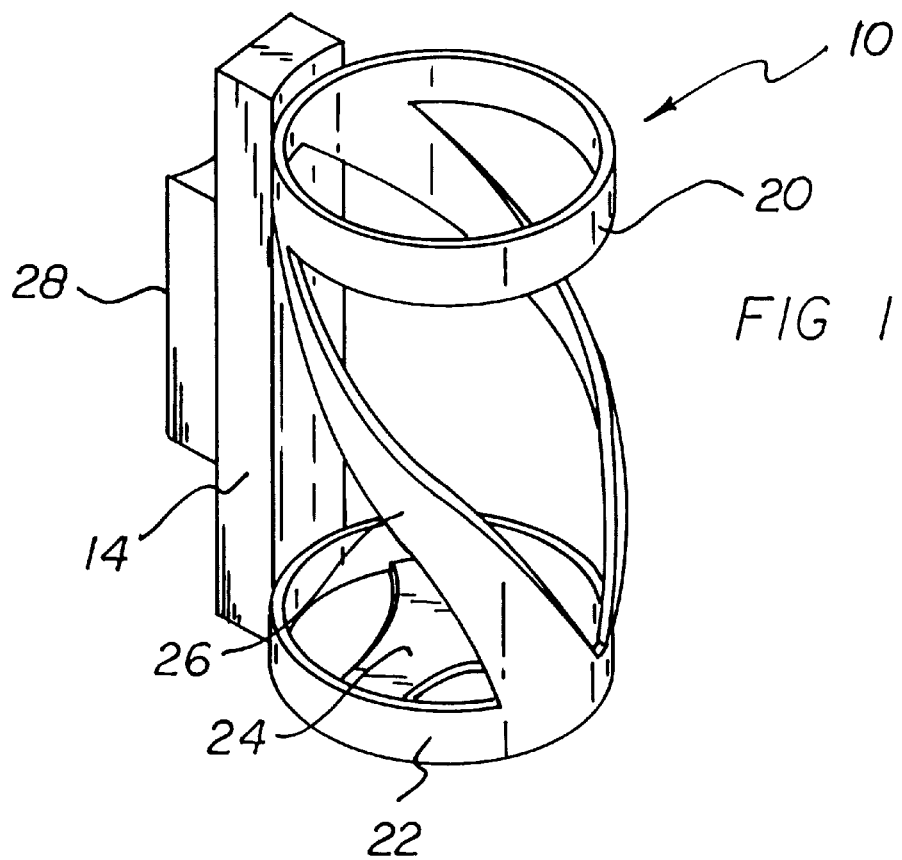
FIG. 1 is a perspective view of the preferred embodiment of the magnetic drinking vessel holding device constructed in accordance with the principles of the present invention.
Figure 2:
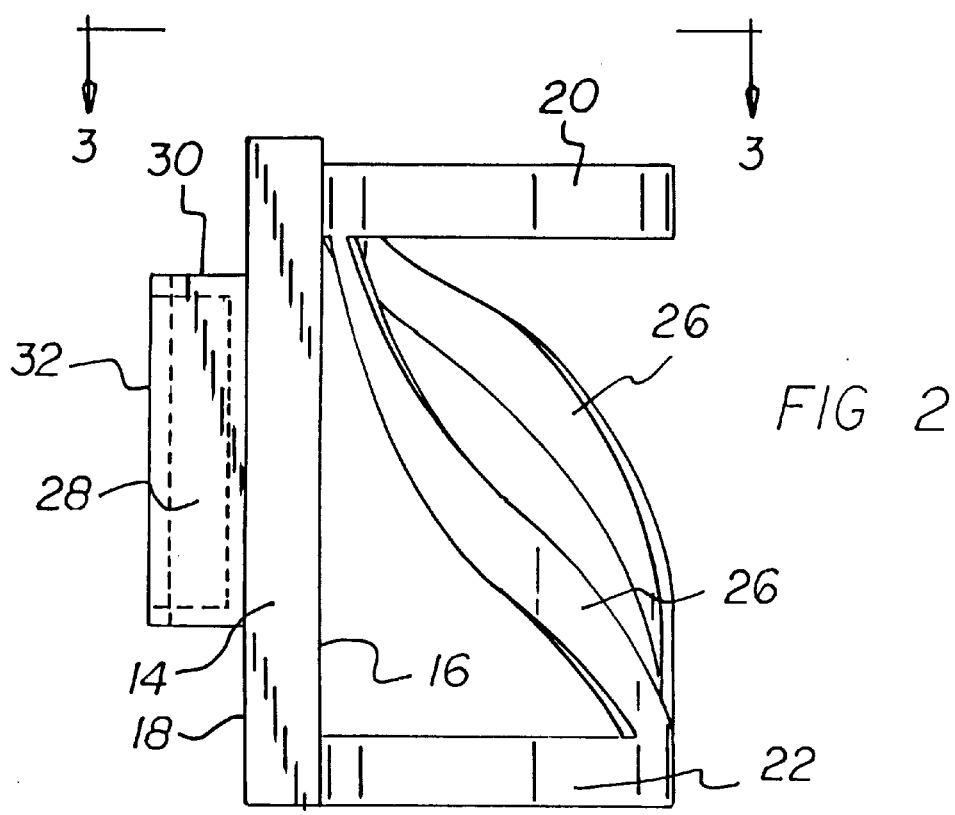
FIG. 2 is a side elevation view of the present invention.
Figure 3:
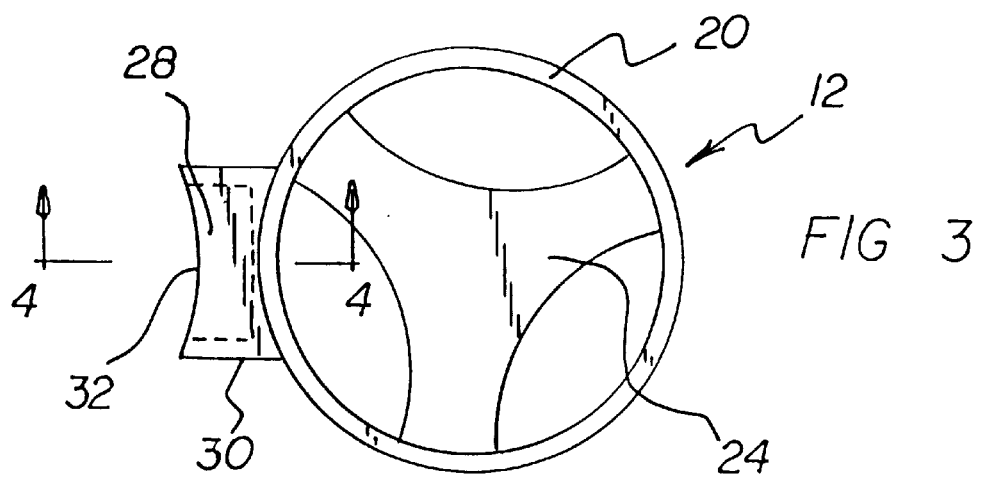
FIG. 3 is a plan view of the present invention as taken along line 3—3 of FIG. 2.
Figure 4:
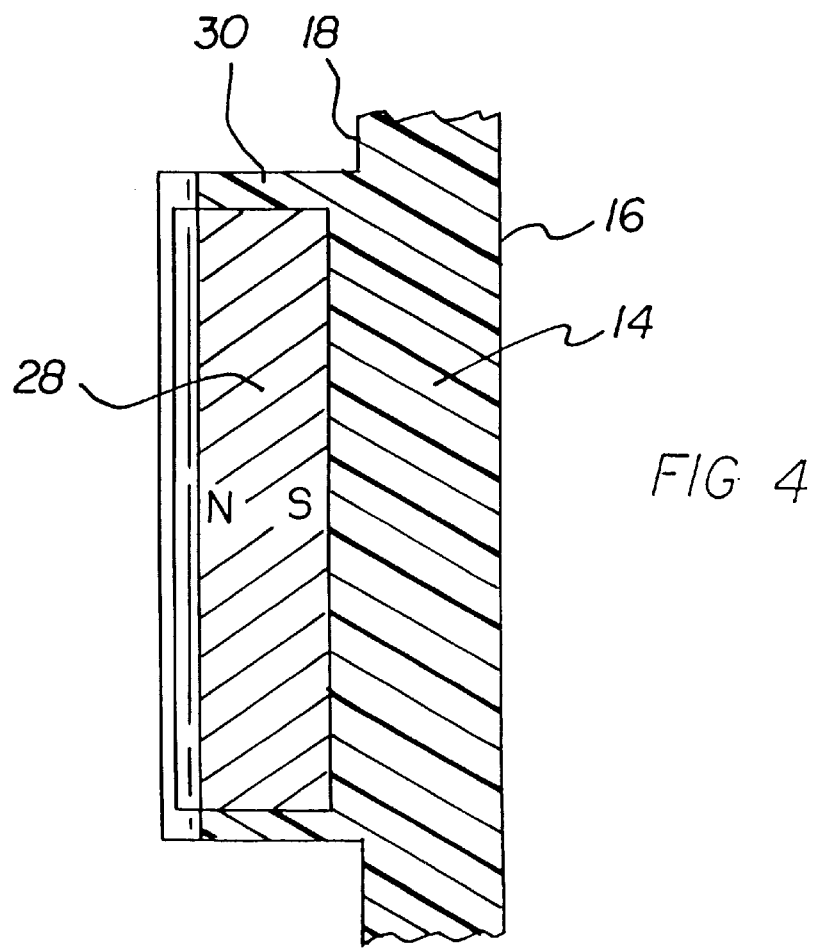
FIG. 4 is a cross-sectional view of the present invention as taken along line 4—4 of FIG. 3.

With reference now to the drawings, and in particular, to FIGS. 1 through 4 thereof, the preferred embodiment of the new and improved magnetic drinking vessel holding device embodying the principles and concepts of the present invention and generally designated by the reference number 10 will be described.

Specifically, it will be noted in the various Figures that the device relates to a magnetic drinking vessel holding device for adhering to a magnetic surface for holding water or the like for easy access by a user. In its broadest context, the device consists of the bottle holding portion and a magnetic securement device. Such components are individually configured and correlated with respect to each other so as to attain the desired objective.

The bottle holding portion 12 is adapted for holding a beverage container therein. The bottle holding portion 12 is comprised of a rectangular base 14 having an arcuate inner surface 16 and a generally planar outer surface 18. The bottle holding portion 12 includes an upper ring 20 secured to an upper end of the arcuate inner surface 16 of the rectangular base 14. The bottle holding portion 12 includes a lower ring 22 secured to a lower end of the arcuate inner surface 16 of the rectangular base 14. The lower ring 22 has a containment bracket 24 disposed therein for supporting a beverage container thereon. The bottle holding portion 12 includes a pair of curved side support braces 26 extending between the upper ring 20 and the lower ring 22 thereof.

The magnetic securement device 28 is coupled with the rectangular base 14 of the bottle holding portion 12. The magnetic securement device 28 has a plastic outer layer 30 disposed thereover. The plastic outer layer 30 acts as a protective layer to prevent any damage from being done to the magnetic securement device 28. The magnetic securement device 28 has an arcuate outer surface 32 for adhering to curved metallic surfaces. The curved metallic surfaces typically are found on frames of exercise equipment and lawn care machinery. As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A magnetic drinking vessel holding device for adhering to a magnetic surface for holding water or the like for easy access by a user comprising, in combination:

a bottle holding portion adapted for holding a beverage container therein, the bottle holding portion being comprised of a rectangular base having an arcuate inner surface and a generally planar outer surface, the bottle holding portion including an upper ring secured to an upper end of the arcuate inner surface of the rectangular base, the bottle holding portion including a lower ring secured to a lower end of the arcuate inner surface of the rectangular base, the lower ring having a containment bracket disposed therein for supporting a beverage container thereon, the bottle holding portion including a pair of curved side support braces extending between the upper ring and the lower ring thereof;

a magnetic securement device coupled with the rectangular base of the bottle holding portion, the magnetic securement device having a plastic outer layer disposed thereover, the magnetic securement device having an arcuate outer surface for adhering to curved metallic surfaces.

* * * * *